United States Patent [19]

Young

[11] 4,243,272

[45] Jan. 6, 1981

[54] RESILIENT LINKAGE MEANS FOR USE IN VEHICLE FLUID PRESSURE BRAKING SYSTEMS

[75] Inventor: Alastair J. Young, Kenilworth, England

[73] Assignee: Automotive Products Limited, Leamington Spa, England

[21] Appl. No.: 76,809

[22] Filed: Sep. 18, 1979

[30] Foreign Application Priority Data

Sep. 20, 1978 [GB] United Kingdom ............. 37547/78

[51] Int. Cl.³ .............................................. B60T 8/18
[52] U.S. Cl. ................................. 303/22 R; 188/195; 303/6 R
[58] Field of Search ................. 303/22 R, 22 A, 6 R, 303/6 C; 188/195, 349; 280/271, 88

[56] References Cited

U.S. PATENT DOCUMENTS

4,050,552  9/1977  Young ............................. 188/195
4,111,494  9/1978  Young ............................ 303/22 R X Primary Examiner—Douglas C. Butler
Attorney, Agent, or Firm—Kemon & Estabrook

[57] ABSTRACT

A vehicle braking system includes a pair of valve devices which compensate for variations in wheel load for each of the rear brakes. The valve devices are controlled by suspension travel through a resilient linkage assembly, but because the suspension is stiffer in roll than in bounce, the linkage is desirably more sensitive in roll. The resilient linkage includes a pair of torsion bars, each of which has a crank arm at one end and a bearing support adjacent to the crank arm. Each crank arm is connected to a respective suspension component, the torsion bars being arranged so that the reaction at the bearing support provides the main control force for the respective valve while the other end of the torsion bar is connected to the other valve to provide a compensating force which is subtractive in the bounce mode but additive in the roll mode.

3 Claims, 7 Drawing Figures

RESILIENT LINKAGE MEANS FOR USE IN VEHICLE FLUID PRESSURE BRAKING SYSTEMS

The invention relates to vehicle fluid pressure braking systems of the kind which comprises a driver-controlled source of fluid pressure, one brake for a resiliently suspended wheel on one side of the vehicle, another brake for a resiliently suspended wheel on the other side of the vehicle, one valve device interposed between the source and said one brake, another valve device interposed between the source and said other brake, each valve device including a plunger which is movable by fluid pressure transmitted to the respective brake against a respective biassing load to prevent the pressure in the respective braking increasing at the same rate as the source when pressure to the respective brake exceeds a magnitude dependent on the respective biassing load, and resilient linkage means connecting the plungers of the valve devices with suspension components of said wheels to provide biassing loads on the plungers which progressively vary with the vertical positions of said wheels relative to the vehicle body such that each biassing load increases with upward movement relative to the vehicle body of the associated wheel but decreases at a lower rate with upward movement relative to the vehicle body of the non-associated wheel.

A braking system of the kind referred to above can provide load-sensitive control of braking according to the load on the respective wheel with a correction for the difference between roll stiffness and bounce stiffness normally found on modern cars.

Whilst such braking systems have been previously proposed in U.S. Pat. Nos. 4,050,552 and 4,116,309 to the same assignee the practical embodiments described do not lend themselves to easy installation in all vehicles, particularly at the rear of rear wheel drive cars where the differential assembly and other transmission components occupy considerable room near the centreline of the car.

It is an object of the present invention to provide a vehicle braking system of the kind referred to in which the valve devices can be installed nearer the sides of the vehicles.

According to the invention in a vehicle fluid pressure braking system of the kind referred to, the resilient linkage means comprises a pair of torsion bars each having a crank arm on one end, a bearing support adjacent the crank arm and torque reaction means at the other end, the free end of the crank arm, the bearing support and the torque reaction means of one torsion bar acting as means by which said one torsion bar connects the suspension component of one of said wheels to the plunger of each valve device and the free end of the crank arm, the bearing support and the torque reaction menas of the other torsion bar acting as means by which said other torsion bar connects the suspension component of the other of said wheels to the plunger of each valve device.

Further aspects of the invention will be described in the following example and with reference to the accompanying drawings, of which.

Referring to FIGS. 1 to 6, there is provided a driver-controlled source of fluid pressure in the form of a master cylinder 11 which is connected to the rear brakes 12 and 13 of a vehicle through valve devices 14 and 15 respectively. Brake 12 acts on the right-hand rear wheel 16 and brake 13 acts on the left-hand rear wheel 17. Each wheel 16, 17 is resiliently suspended by a conventional spring suspension and is carried on a respective trailing arm 18, 19.

The valve devices 14 and 15 are conventional load sensitive pressure reducing valves as described in U.S. Pat. No. 4,008,925 hereby incorporated by reference. They each include a plunger 21 (FIGS. 4 and 5) which is movable to prevent pressure at an outlet port 22 from increasing at the same rate as pressure at an inlet port 23. Each plunger 21 is adapted to receive a biassing load from a button 24 attached to a respective lever 25 which is pivoted to the respective valve body by a respective pivot pin 26. The inlet ports 23 are both connected to the master cylinder 11 whilst each outlet port 22 is connected to the respective brake 12 or 13. The magnitude of the biassing load controls the point at which the outlet pressure starts to be reduced compared with the inlet pressure.

Figure 1:
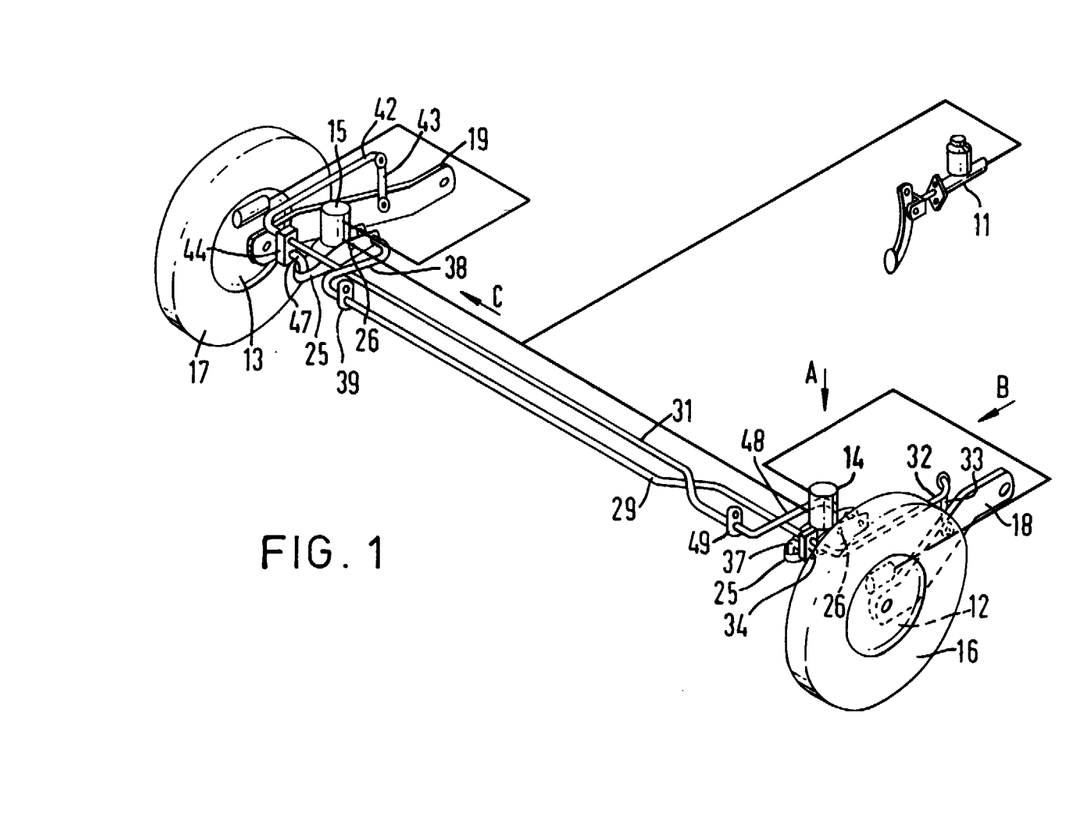
FIG. 1 is a diagrammatic perspective view of a vehicle braking system according to the invention, showing also the rear wheels of the vehicle and part of their suspension, the view being from behind the vehicle and to the right-hand side.
Figure 2:
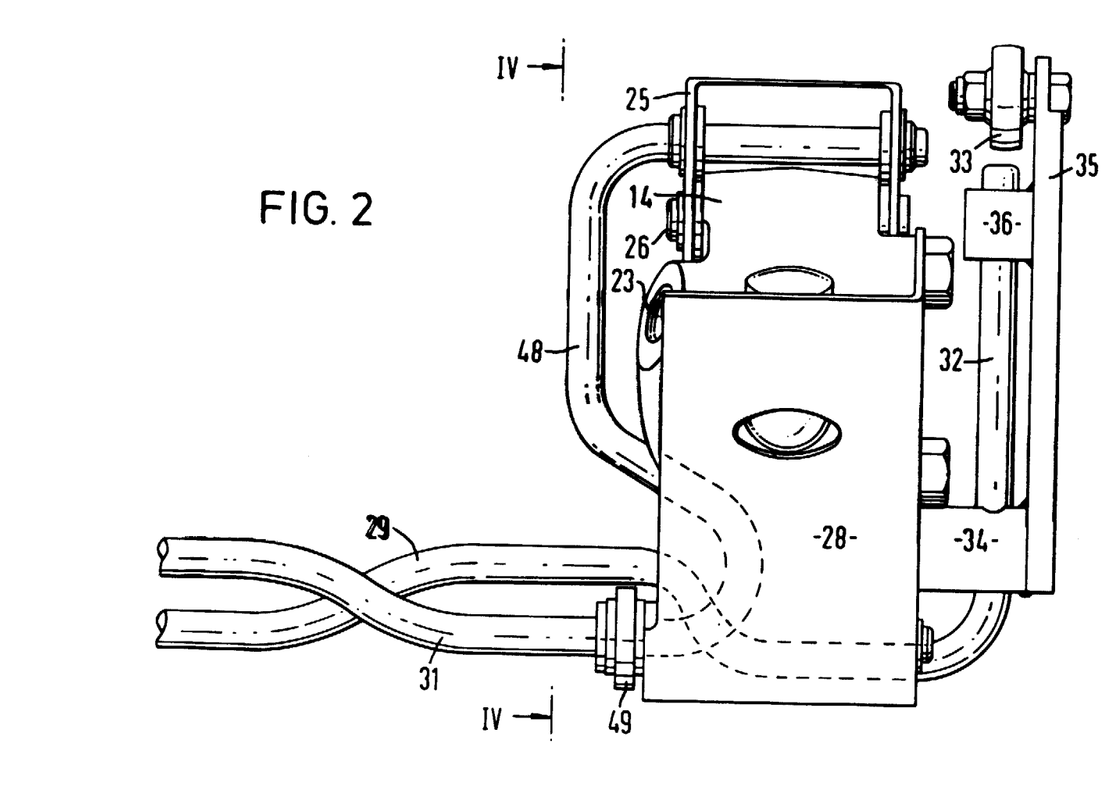
FIG. 2 is a partial plan view on arrow A of FIG. 1 with certain bracket details added.
Figure 3:
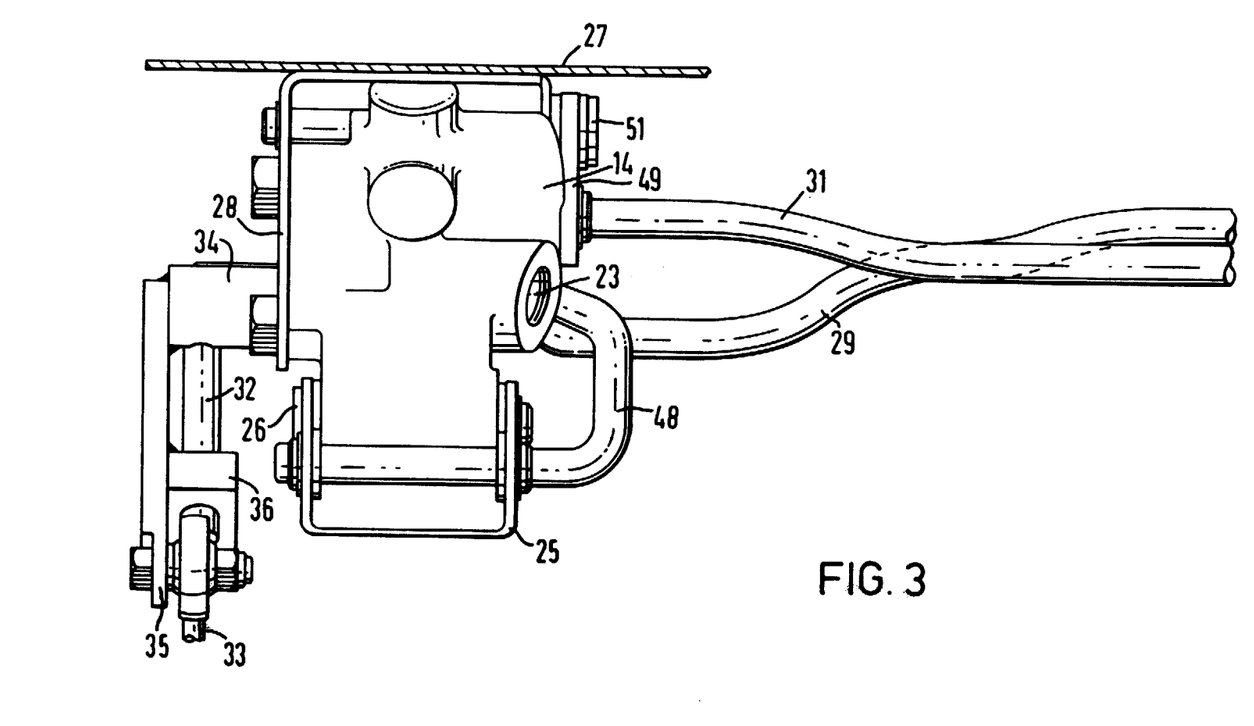
FIG. 3 is a partial elevation on arrow B of FIG. 1 with certain bracket and body details added.

Each valve 14, 15 is rigidly attached to the vehicle body 27 by a respective bracket 28 (not shown in FIG. 1). To provide the biassing loads on the plungers the levers 25 are connected to the suspension trailing arms 18 and 19 by a resilient linkage, the principal components of which are two torsion bars 29 and 31.

Torsion bar 29 has a crank arm 32 on one hand the free end of which is connected to the right-hand suspension trailing arm 18 by a link 33. Crank arm 32 is shown simplified in FIG. 1 for clarity. It is combined with a welded fabrication bearing support comprising a clamp block 34, lever arm 35 and guide block 36.

Figure 4:
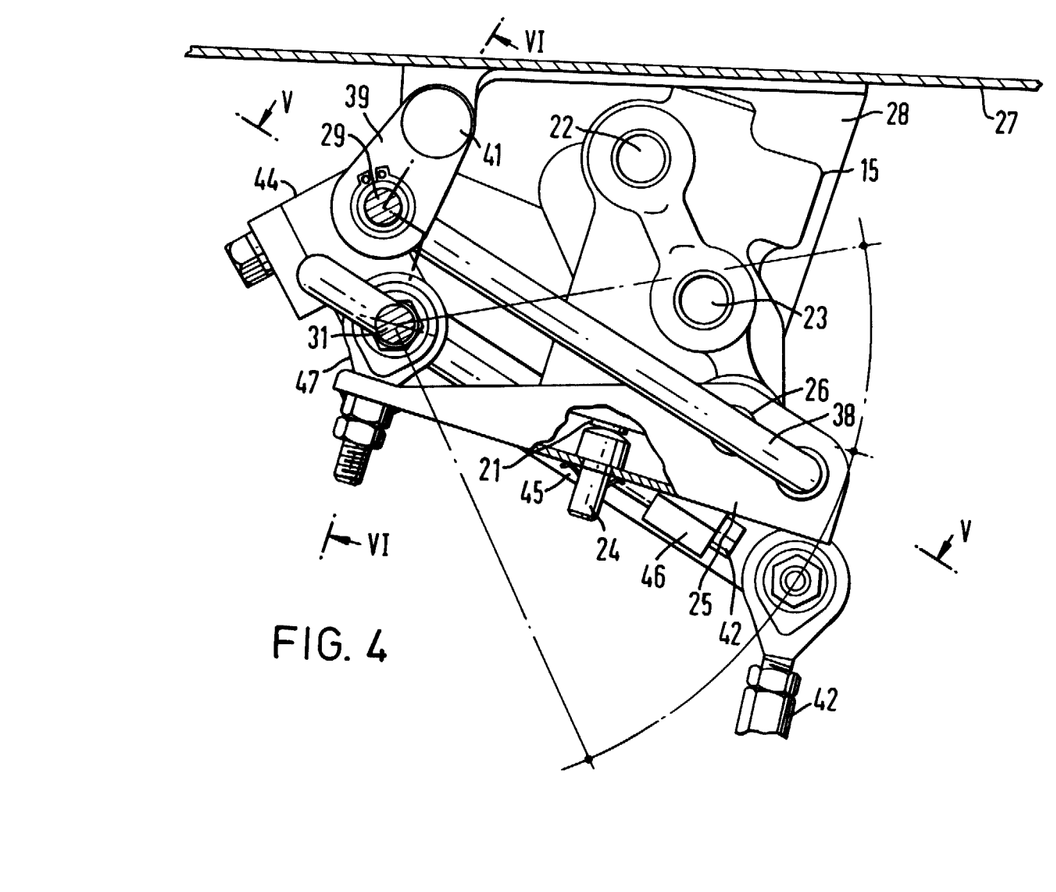
FIG. 4 is a partial elevation on arrow C of FIG. 1 and corresponds in mirror image to a section on line IV—IV in FIG. 2.
Figure 5:
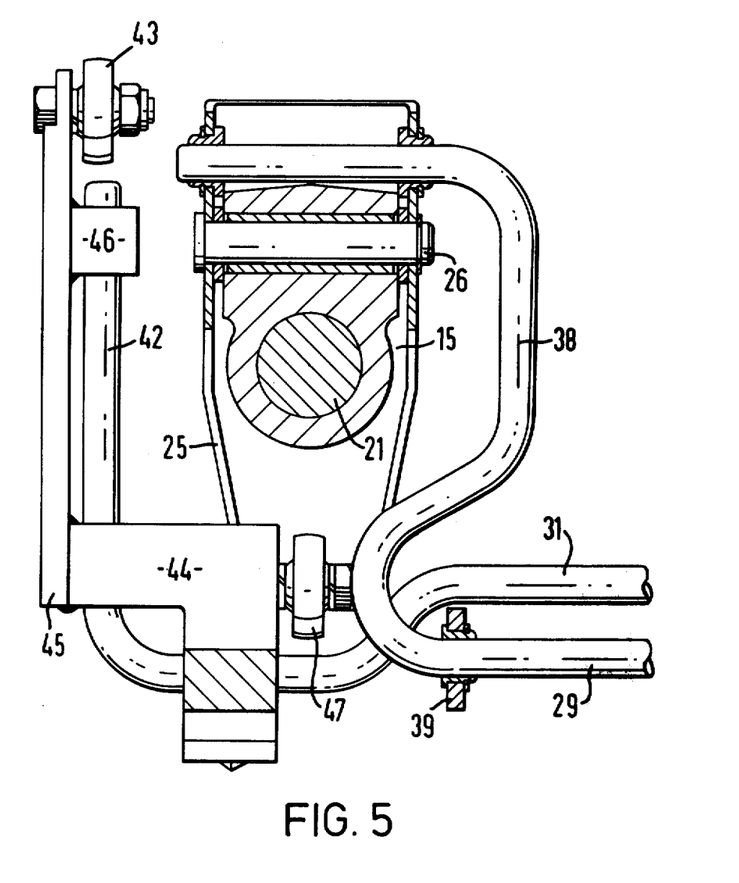
FIG. 5 is a section on line V—V of FIG. 4.
Figure 6:
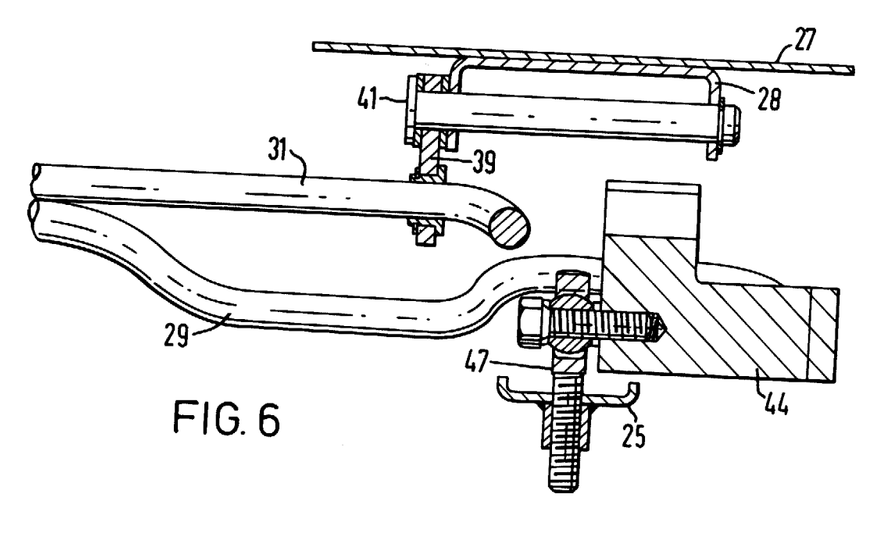
FIG. 6 is a section on line VI—VI of FIG. 4.

The bearing support/clamp block 34 is also shown simplified in FIG. 1. It provides a bearing support on the torsion bar 29 adjacent the crank arm 32 by which the torsion bar 29 is connected to lever 25 of valve 14 through a standard spherical eye end bearing 37. This bearing 37 is not shown in FIGS. 2 and 3 but the corresponding bearing 47 on the lever 25 of the other valve 15 is shown in FIGS. 4, 5 and 6. The bearing 37 is screwed directly into a nut welded to lever 25 and is attached to block 34 by a setscrew.

At the opposite end of torsion bar 29 to the crank arm 32 there is provided torque reaction mean in the form of another crank arm 38 whose free end pivots directly in the lever 25 of valve 15. This torsion bar 29 is supported adjacent crank arm 38 by a bearing link 39 pivoted to the attachment bracket 28 of valve 15 by a pivot pin 41 (FIG. 6).

The other torsion bar 31 is effectively a mirror image of bar 29 except that the bars are both cranked near the right-hand valve 14 to provide clearance for each other. Torsion bar 31 has a crank arm 42 corresponding to crank arm 32 by which it is connected to the left-hand suspension trailing arm through a link 43 corresponding to link 33. There is a corresponding welded fabrication attached to the crank arm 42 which comprises a bearing support/clamp block 44, a lever arm 45 and a guide block 46. Adjacent the crank arm 42 there is a spherical eye end bearing 47 corresponding to bearing 37 and referred to above.

At the other end of torsion bar 31 there is a further crank arm 48 corresponding to crank arm 38. This is directly pivoted to the lever 25 of valve 14 and there is provided a corresponding bearing link 49 and pivot pin 51 to support the torsion bar 31 adjacent the crank arm 38.

The torsion bars are assembled to the vehicle and adjusted (by means of links 33 and 43) to have zero torque when the vehicle is in the driver-only condition of load (this is a convenient setting for a particular vehicle and can be altered to suit other vehicle installations). If the vehicle is now provided with additional load then the body will drop on the suspension having the effect of both rear wheels 16 and 17 moving upwards relative to the vehicle body. Considering the right hand rear wheel 16, the suspension trailing arm moves clockwise as a result (when viewed from the side of the vehicle) and the crank arm 32 of torsion bar 29 moves anti-clockwise. Movement of the other end of torsion bar 29 is resisted by crank arm 38 so that a torque is induced into torsion bar 29 which is directly proportioned to the position of rear wheel 16 relative to the vehicle body. This induced torque produces an upward load on bearing support 34 to react the load from link 33 and hence a biassing load is put on the plunger 21 of valve 14 through bearing 37, and its lever 25.

Wheel 17 behaves correspondingly so that a similar biassing load is put in the plunger 21 of valve 15. However, the reaction load of arm 38 acts on lever 25 of valve 15 to partially offset the biassing load from bearing support 44 and similarly the reaction load of arm 48 acts on lever 25 of valve 14 to partially offset the biassing load from bearing support 34. Hence with upward movement of wheel 16 relative to the vehicle body the biassing load on the plunger 21 of valve 15 decreases and similarly with upward movement of wheel 17 relative to the vehicle body the biassing load on the plunger 21 of valve 14 also decreases. The rate of decrease in biassing loads with upward movement of the rear wheels 16 and 17 is less than the rate of increase by virtue of the relationship between the lengths of the crank arms 32, 38, 42 and 48 and the moment arms of levers 25.

The effect of the partial reductions in biassing loads is apparant when the vehicle corners. For example, in a left-hand corner the load on the right-hand wheel 16 increases whilst the load on the left hand wheel 17 decreases so that wheel 16 moves upwards relative to the vehicle body and wheel 17 downwards. Thus the torque in torsion bar 29 increases and that in torsion bar 31 decreases (or becomes negative). Hence the plunger 21 of valve 14 receives an increased biassing load from torsion bar 31 as well as an increased biassing load from torsion bar 29. Similarly the biassing load on the plunger 21 of valve 15 is reduced by both torsion bars. The result is reduced braking for the wheel 17 which is on the inside of the corner and normal or increased braking (according to wheel load) for the wheel 16 which is on the outside of the vehicle. The larger variations in biassing loads during roll for the same magnitude of wheel movement experienced during static load changes or over bumps compensates for the greater roll stiffness of the rear suspension of the vehicle compared with its bounce stiffness.

Figure 7:
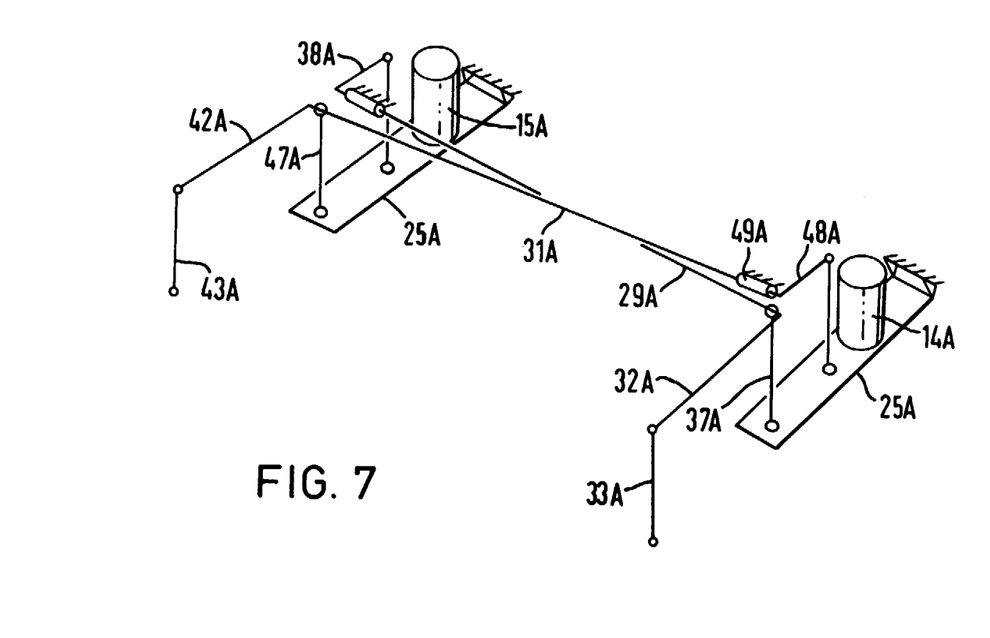
FIG. 7 is a diagrammatic perspective view of modification to the braking system shown in FIG. 1.

In the modification shown diagrammatically in FIG. 7 parts which are the same or similar to those shown in FIG. 1 have the same reference with a suffix A.

The geometry of the torsion bars 29A, 31A is changed so that crank arms 32A and 42A extend towards the rear of the vehicle and crank arms 38A and 48A react torques which are normally opposite to the torques reacted by the corresponding crank arms 38 and 48. Links 33A and 43A have connections to the rear wheel suspension corresponding to those for links 33 and 43 so that links 33A and 43A move upwards relative to the vehicle body with increasing wheel load. Hence operation of the modified torsion bar linkage is similar to that described above.

Other springs may be used if required to suit the installation constraints of the particular vehicle. For example, links 33, 43, 33A and 43A may each be replaced by a spring. This would have the effect of putting each spring in series with the respective torsion bar which could be made stiffer as a result. The addition of other springs to supplement the torsion bars enables the linkage to be designed to fail safe in the sense that one set of springs can be made to exert a preload which is offset by the other set of springs. In this way the other set of springs are those which are subjected to the varying loads during normal travel of the vehicle and thus more prone to fatigue failure. The preloaded springs will maintain the biassing load on the valve plungers in the event of such fatigue failure and thus enable maximum braking to be obtained.

I claim:

1. In a vehicle fluid pressure braking system comprising:

a driver-controlled source of fluid pressure;
one brake for a resiliently suspended wheel on one side of the vehicle;
another brake for a resiliently suspended wheel on the other side of the vehicle;
one valve device interposed between the source and said one brake; and
another valve device interposed between the source and said other brake;
each valve device including a plunger which is movable by fluid pressure transmitted to the respective brake against a respective biassing load to prevent the pressure in the respective brake increasing at the same rate as the source when the pressure to the respective brake exceeds a magnitude dependent on the respective biassing load;
resilient linkage means for connecting the plungers of the valve devices with suspension components of said wheels to provide biassing loads on the plungers which progressively vary with the vertical positions of said wheel relative to the vehicle body such that each biassing load increases with upward movement of the associated wheel relative to the vehicle body but decreases at a lower rate with upward movement of the non-associated wheel;
the resilient linkage means comprising:
a pair of torsion bars each having a crank arm on one end;
a bearing support adjacent the crank arm and torque reaction means at the other end;

the plunger of one of the valve devices in use being connected to the suspension component of one of said wheels through the bearing support of one torsion bar and to the suspension component of the other of said wheels through the torque reaction means of the other torsion bar and the plunger of the other of the valve devices in use being connected to the suspension component of said other wheel through the bearing support of said other torsion bar and to the suspension component of said one wheel through the torque reaction means of said one torsion bar.

2. The resilient linkage means of claim 1, further comprising one lever pivoted to said one valve device, said one lever being connected to the bearing support of one torsion bar and to the torque reaction means of the other torsion bar and applying the respective biassing load to the plunger of said one valve device and another lever pivoted to the other valve device, said other lever being connected to the bearing support of said other torsion bar and to the torque reaction means of said other torsion bar and applying the respective biassing load to the plunger of said other valve device.

3. The resilient linkage means of claim 2, wherein each of said torque reaction means comprises a respective further crank arm.

* * * * *